US009934012B2

(12) United States Patent
Nobuta et al.

(10) Patent No.: US 9,934,012 B2
(45) Date of Patent: Apr. 3, 2018

(54) PARALLELIZATION COMPILING METHOD, PARALLELIZATION COMPILER, AND VEHICULAR DEVICE

(71) Applicants: DENSO CORPORATION, Kariya, Aichi-pref. (JP); WASEDA UNIVERSITY, Shinjuku-ku, Tokyo (JP)

(72) Inventors: Kazushi Nobuta, Kariya (JP); Noriyuki Suzuki, Kariya (JP); Hironori Kasahara, Tokyo (JP); Keiji Kimura, Tokyo (JP); Hiroki Mikami, Nishitokyo (JP); Dan Umeda, Tokyo (JP)

(73) Assignees: DENSO CORPORATION, Kariya (JP); WASEDA UNIVERSITY, Tokyo (JP)

( * ) Notice: Subject to any disclaimer, the term of this patent is extended or adjusted under 35 U.S.C. 154(b) by 0 days.

(21) Appl. No.: 15/083,526

(22) Filed: Mar. 29, 2016

(65) Prior Publication Data
US 2016/0291948 A1 Oct. 6, 2016

(30) Foreign Application Priority Data
Mar. 31, 2015 (JP) .................................. 2015-72812

(51) Int. Cl.
*G06F 9/45* (2006.01)
(52) U.S. Cl.
CPC .................... *G06F 8/451* (2013.01)
(58) Field of Classification Search
None
See application file for complete search history.

(56) References Cited

U.S. PATENT DOCUMENTS

| 5,452,461 A * | 9/1995 | Umekita ................ G06F 8/45 717/146 |
| 2003/0033588 A1* | 2/2003 | Alexander ............. G06F 9/54 717/107 |

(Continued)

FOREIGN PATENT DOCUMENTS

| JP | 2004-252728 A | 9/2004 |
| JP | 2004-310651 A | 11/2004 |

OTHER PUBLICATIONS

U.S. Appl. No. 15/083,502, filed Mar. 29, 2016, Yatou et al.
U.S. Appl. No. 15/083,592, filed Mar. 29, 2016, Mineda et al.

*Primary Examiner* — Chameli Das
(74) *Attorney, Agent, or Firm* — Posz Law Group, PLC (57) ABSTRACT

A parallelization compiling method for generating a segmented program from a sequential program includes assigning macro tasks included in the sequential program to cores included in the multi-core processor in order to generate the segmented program, adding a new macro task to the sequential program or deleting one of the macro tasks from the sequential program, and compiling the sequential program into the segmented program in response to the adding of the new macro task under a condition that the macro tasks assigned to the cores do not migrate among the cores or compiling the sequential program into the segmented program in response to the deleting of the one of the macro tasks under a condition that remains of the macro tasks assigned to the cores do not migrate among the cores.

14 Claims, 8 Drawing Sheets

(56) References Cited

U.S. PATENT DOCUMENTS

| | | | |
|---|---|---|---|
| 2003/0105620 A1* | 6/2003 | Bowen | G06F 17/5022 703/22 |
| 2004/0172626 A1* | 9/2004 | Jalan | G06F 8/456 717/149 |
| 2008/0086617 A1 | 4/2008 | Kasahara et al. | |
| 2008/0229297 A1* | 9/2008 | Archambault | G06F 8/443 717/156 |
| 2010/0070958 A1* | 3/2010 | Takagi | G06F 8/456 717/149 |
| 2010/0153654 A1* | 6/2010 | Vorbach | G06F 12/0862 711/137 |
| 2010/0174876 A1 | 7/2010 | Kasahara et al. | |
| 2012/0131309 A1* | 5/2012 | Johnson | G06F 9/30 712/41 |
| 2014/0372995 A1 | 12/2014 | Mori et al. | |

* cited by examiner

PARALLELIZATION COMPILING METHOD, PARALLELIZATION COMPILER, AND VEHICULAR DEVICE

CROSS REFERENCE TO RELATED APPLICATION

This application is based on Japanese Patent Application No. 2015-072812 filed on Mar. 31, 2015, the disclosure of which is incorporated herein by reference.

TECHNICAL FIELD

The present disclosure relates to a parallelization compiling method, a parallelization compiler, and a vehicular device, each of which generates a segmented parallelized program for a multi-core processor from a sequential program prepared for a single-core processor.

BACKGROUND

In order to sophisticate and integrate a control system and an information system in a vehicle, it is important to obtain a higher capacity of a processor for implementing the sophistication and the integration. For example, in order to sophisticate an engine control system playing an important role in development of a vehicle which is safe, comfortable and excellent in fuel economy, an increase in a calculation load, such as a sophistication of a control algorithm or a realization of a new control function is required. In order to solve the above problem, an increase of a processing speed of a processor for realizing a real-time control is indispensable.

However, it is difficult to improve an operating frequency of the processor as in the conventional art because power consumption is increased in proportion to the cube of the frequency. For that reason, multiple processor cores having a low operating frequency are integrated on one chip together, and the processor cores that are reduced in the frequency and the voltage for power consumption reduction are operated in parallel manner, to thereby transit to a multi-core processor that can realize an increase in the processing speed and a reduction in the power consumption at the same time at a rapid pace.

In order that the multi-core processor performs the processing at a higher speed than that of the single-core processor, a process of a sequential program for the single-core processor needs to be divided into sub-processes, and the respective sub-processes need to be assigned to respective processing cores so that a communication among the respective processing cores is minimized. Up to now, the work for parallelizing the sequential program as described above needs to be manually performed. However, such work is very difficult, and requires a long period of time, and suffers from many problems such as an increase in development costs and the reliability of the parallelized program.

JP 2015-001807 A (corresponding to US 2014/0372995 A1) proposes a parallelization compiling method that is capable of creating a parallelized program for a vehicular device built-in system which is high in reliability and can perform high-speed processing while suppressing a development period of time and the development costs.

In the conventional art, when the sequential program prepared for the single-core processor is parallelized once, and thereafter a macro task is added to or deleted from the sequential program, the parallelizing process is performed again. For that reason, a macro task assigned to a first core in a first parallelizing process may be assigned to a second core in a subsequent parallelizing process. That is, the macro task to which no change is carried out compared with a state in which the macro task is included in the first sequential program, that is, the macro task to which no addition or no deletion is carried out may move between the cores. The movement of the macro tasks between or among the cores may cause a substantial change of the overall program and an increase of test man-hours after the parallelization is carried out.

SUMMARY

In view of the foregoing difficulties, it is an object of the present disclosure to provide a parallelization compiling method, a parallelization compiler, and a vehicular device, each of which is capable of suppressing, when a program change such as addition or deletion is made to a macro task included in the sequential program, adverse effect caused by the program change to an execution of another macro task which has no change when compiling the sequential program into a segmented program.

According to a first aspect of the present disclosure, a parallelization compiling method for generating a segmented program, which is executable by a multi-core processor, from a sequential program, which is executable by a single-core processor, by parallelizing the sequential program is provided. The parallelization compiling method includes assigning one or more macro tasks included in the sequential program to a plurality of cores included in the multi-core processor in order to generate the segmented program, adding a new macro task to the sequential program or deleting one of the one or more macro tasks from the sequential program, and compiling the sequential program into the segmented program in response to the adding of the new macro task under a condition that the one or more macro tasks assigned to the plurality of cores do not migrate among the plurality of cores or compiling the sequential program into the segmented program in response to the deleting of the one of the one or more macro tasks under a condition that remains of the one or more macro tasks assigned to the plurality of cores do not migrate among the plurality of cores.

According to a second aspect of the present disclosure, a parallelization compiler stored in a non-transitory tangible computer readable storage medium as a program product is provided. The parallelization compiler generates a segmented program, which is executable by a multi-core processor, from a sequential program, which is executable by a single-core processor, by parallelizing the sequential program. The parallelization compiler includes instructions to be executed by a parallelization compiling device. The instructions for implementing assigning one or more macro tasks included in the sequential program to a plurality of cores included in the multi-core processor in order to generate the segmented program, adding a new macro task to the sequential program or deleting one of the one or more macro tasks from the sequential program, and compiling the sequential program into the segmented program in response to the adding of the new macro task under a condition that the one or more macro tasks assigned to the plurality of cores do not migrate among the plurality of cores or compiling the sequential program into the segmented program in response to the deleting of the one of the one or more macro tasks under a condition that remains of the one or more macro tasks assigned to the plurality of cores do not migrate among the plurality of cores.

According to a third aspect of the present disclosure, a vehicular device including a multi-core processor is provided. The multi-core processor of the vehicular device operates based on a segmented program, which is executable by the multi-core processor and is generated by parallelization from a sequential program executable by a single-core processor. The multi-core processor is configured to assign one or more macro tasks included in the sequential program to a plurality of cores included in the multi-core processor in order to generate the segmented program, add a new macro task to the sequential program or deleting one of the one or more macro tasks from the sequential program, and compile the sequential program into the segmented program in response to the adding of the new macro task under a condition that the one or more macro tasks assigned to the plurality of cores do not migrate among the plurality of cores or compile the sequential program into the segmented program in response to the deleting of the one of the one or more macro tasks under a condition that remains of the one or more macro tasks assigned to the plurality of cores do not migrate among the plurality of cores.

According to the above parallelization compiling method, parallelization compiler, and vehicular device, the sequential program is compiled into the segmented program in response to the addition and/or the deletion of the macro task under a condition that the macro tasks assigned to the multiple cores do not move or migrate between or among the multiple cores. Thus, when a macro task is added to or deleted from the sequential program, the sequential program can be compiled into the segmented program without affecting the macro tasks, which have no program change. Herein, program change may include program addition or program deletion.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

The following will describe an embodiment of the present disclosure with reference to the accompanying drawings.

For the purpose of facilitating understanding of a description, the same or equivalent components in the respective drawings are denoted by identical reference numerals and redundant description will be omitted.

An automatic parallelization compiler according to a first embodiment, a second embodiment, and a third embodiment of the present disclosure has a function of generating a parallelized program (segmented program) for a multi-core processor system of a built-in system. The parallelized program is also referred to as a segmented program, and is generated from a sequential program, which is also referred to as a source program. Herein, the sequential program is prepared for a single-core processor system of a built-in system.

1-1. Design Concept of Automatic Parallelization Compiler

The automatic parallelization compiler according to the present embodiment has the following functions.

(1) Multi-grain parallel processing
(2) Insertion of static scheduling code during compiling
(3) Generation of dynamic scheduling code during execution
(4) Realization of hierarchical macro data flow
(5) Segmentation/aggregation of macro task, parallelism extraction of loop distribution/interchange
(6) Improvement in data transmission efficiency by data localization
(7) Power consumption reduction by compiler 1-2. Internal Processing of Automatic Parallelization Compiler The automatic parallelization compiler has three stages of a front end (FE), a middle path (MP), and a back end (BE). Each of these stages is independent from one another when being executed, and code transfer is performed by an intermediate language generated from the FE and the MP.

The FE is configured to perform a lexical analysis and a syntax analysis of a source code of the sequential program and generate a parsable intermediate language in the MP. The intermediate language generated by the FE is basically expressed by a parse tree having four operands, and forms one block as a whole and is not structured.

The MP is configured to perform a control dependency analysis, a data dependency analysis, optimization and the like, and performs multi-grain parallel processing of coarse grain, medium grain, and near fine grain parallelization with the use of data.

The BE is configured to read a parallelization intermediate language generated by the MP and generate an actual machine code. The BE has a BE for generating an assembler code of a multi-core architecture that is targeted as well as a BE for generating a parallelized Fortran code and a C code for OpenMP. In addition, the BE has a BE for outputting codes corresponding to a variety of architectures such as a BE for generating a code parallelized with the inclusion of a memory arrangement and data transmission by a parallelization API to be described later.

1-3. Parallelism Analysis of Automatic Parallelization Compiler

The automatic parallelization compiler performs a macro data flow processing for segmenting a sequential program into three kinds of coarse grain tasks a basic block (BB), a repetition block (RB), and a subroutine block (SB). The coarse grain task is also referred to as a macro task (MT). In some cases, the macro data flow processing suffers from such a problem that a utilization efficiency of the processor is not enhanced due to a shape of the program, and a sufficient coarse grain parallelism cannot be extracted.

Under the circumstances, the automatic parallelization compiler employs hierarchical macro data flow processing that expands a conventional single hierarchical macro data flow processing technique, and hierarchically uses macro data flow processing within the MT. In the hierarchical macro data flow processing, the MT is hierarchically defined, and the parallelism between the macro tasks is analyzed for each hierarchy.

(Generation of Macro Flow Graph (MFG))

The automatic parallelization compiler first analyzes a control dependency and a data dependency between the macro tasks for the generated macro tasks of the respective hierarchies. The analysis results are expressed as a macro flow graph (MFG).

(Generation of Macro Task Graph (MTG))

The MFG represents the control dependency and the data dependency among the macro tasks, but does not represent the parallelism. In order to extract the parallelism, it is necessary to analyze an earliest executable condition considering both of the control dependency and the data dependency. The earliest executable condition is a condition under which the MT is executable at an earliest time point, and is obtained from the following execution conditions.

(1) When an MTi is data-dependent on an MTj, the MTi cannot be executed until the execution of the MTj is completed.

(2) When a conditional branch destination of the MTj is determined, the MTi control-depending on the MTj can be executed even if the execution of the MTj is not completed.

Accordingly, a general form of an earliest executable condition is expressed as follows.

Earliest executable condition: (the MTj on which the MTi is control-dependent is branched to the MTi) AND ((an MTk (0≤k≤|N|) on which the MTi is data-dependent is completed) OR (it is determined that the MTk is not executed)).

The earliest executable condition of the macro task is represented by a macro task graph (MTG).

1-4. Multi-Grain Parallel Processing

The automatic parallelization compiler realizes, in addition to the conventional loop parallelization, multi-grain parallel processing that effectively combines a coarse grain task parallel processing with a near fine grain parallel processing (refer to "parallelism detection method between Fortran program coarse grain tasks" in Institute of Electronics, Information and Communication Engineers Journal, 1990 by Hiroki Honda, Masahiko Iwata, and Hironori Kasahara). The coarse grain task parallel processing uses the parallelism between the coarse grain tasks between loops and between the subroutines, and the near fine grain parallel processing uses the parallelism between statements.

(Coarse Grain Task Parallel Processing)

The automatic parallelization compiler generates a macro flow graph (MFG) representing the control dependency and the data dependency between the MTs of the BB, the RB, and the SB. The automatic parallelization compiler further expresses the parallelism of the MTs extracted from the MFG by the earliest executable condition analysis as the macro task graph (MTG) (refer to "parallelism detection method between Fortran program coarse grain tasks" in Institute of Electronics, Information and Communication Engineers Journal, 1990 by Hiroki Honda, Masahiko Iwata, and Hironori Kasahara and "Macro task generation method of Fortran macro data flow processing", IEICE, 1992, Vol. J75-D-I, No. 8, pp. 511-525 by Kasahara, Goda, Yoshida, Okamoto, and Honda,).

Thereafter, the automatic parallelization compiler assigns the MT on the MTG to a processor group (PG) into which one or more processor elements (PE) are grouped.

(Medium Grain Parallel Processing)

The MT assigned to the PG is subjected to medium grain parallel processing by a processor within a processor cluster if the parallel processing is enabled in the MT in a DOALL loop or at an iteration level. The medium grain parallel processing represents parallel processing using the parallelism between DO loop iterations, and is most general in the parallel processing in the multi-core processor.

(Near Fine Grain Parallel Processing)

The parallel processing of the statement level for the near-fine grain tasks is called "near fine grain parallel processing". As a result, the parallel execution can be performed in the statement without dependency, and an execution duration is reduced.

1-5. Macro Task Scheduling

In the coarse grain task parallel processing, the macro task generated in each hierarchy is assigned to the PG and executed. A scheduling technique for determining to which PG the macro task is assigned includes a dynamic scheduling and a static scheduling, which will be described below, and those scheduling are selected on the basis of a shape of the macro task graph, an execution time non-determinacy and the like.

(Dynamic Scheduling)

When the execution time uncertainty such as conditional branching is present, the macro task is assigned to the PG during the execution by the dynamic scheduling. The dynamic scheduling routine operates a macro task execution management table according to the termination of the macro task or the determination of a branch direction, and examines the earliest executable condition for each macro task.

If the macro tasks can be executed, the macro tasks are put into a ready queue. The macro tasks within the ready queue are sorted according to its priority, and a head macro task in the ready queue is assigned to the processor cluster of an idle state.

Also, at the time of generating the dynamic scheduling code, a centralized scheduling system and a distributed scheduling system can be selectively used according to the number of processors to be used, and a synchronization overhead of the system. In the centralized scheduling system, one dedicated processor performs scheduling, and in the distributed scheduling system, a scheduling function is distributed to the respective processors.

(Static Scheduling)

On the other hand, the static scheduling is a system used when the macro task graph has only a data dependency edge, in which the automatic parallelization compiler determines the assignment of the macro task to the PG during the compiling.

The static scheduling can be effectively used for the scheduling of the task fine in the grain because the static scheduling can eliminate an execution time scheduling overhead, and minimize the overhead synchronous with data transmission.

During the static scheduling, the costs of the task are applied with a task cost estimate value in the automatic parallelization compiler, but the task scheduling can be performed in a real cost with the use of a profile automatic feedback function of the automatic parallelization compiler.

When the profile automatic feedback function is used, the sequential program is decomposed into the MT as a first phase, and a profiler function is inserted for each MT to generate the sequential program. In the profiler function, a task execution cost (clock cycle) and the number of times of task execution are measured. The sequential program into which the profiler function is inserted is executed on a machine to be targeted once, and a file having information on the task execution cost and the number of times of tasks on the machine to be targeted is output.

Then, in a second phase, the parallelized program scheduled on the basis of the real cost is generated with the output file and the sequential program as inputs.

1-6. Data Localization

The automatic parallelization compiler can perform a cache optimization over the entire program. When the automatic parallelization compiler finds that there is a data dependency between the loops after analyzing the parallelism, the automatic parallelization compiler attempts the global optimization of the cache between the loops having the dependency (refer to Japanese Patent No. 4177681).

Specifically, a sequence to be accessed in each loop is investigated, and the same split loops are adjusted to access to the same sequence portion, to thereby assign the same split loop to the same processor. As a result, in the same split loop, all of sequence data is reused in a cache.

The above localization technology has evolved into a local memory management, and data transmission technology described below (refer to GB Patent No. 2,478,874).

(1) When a local memory or distributed shared memory of an arbitrary size is provided, before the memory is accessed with the use of a DMA (DTU) (refer to Japanese Patent No. 4476267), data is pre-loaded into the local or distributed shared memory in close proximity to the processor, and reused in the program throughout.

(2) When a destination memory is full, after a DTU of a destination processor is informed by a synchronization flag that data has been transferred into the shared memory or the like according to a transfer priority order from the memory, the DTU transfers the data into a memory that is automatically empty.

(3) When data to be reused in the future is not used for a while, and an area of the memory needs to be emptied, the DTU retracts the data into a centralized shared memory behind a task execution by the CPU, and reloads the data into the memory till a use time.

1-7. Generation of Parallelized Program

In the generation of the parallelized program in the automatic parallelization compiler, parallelization can be performed in source-to-source such as parallelization C or parallelization Fortran with the use of automatic parallelization API (refer to "Optimally Scheduled Advanced Multiprocessor Application Program Interface", 2008 by Waseda University).

In that case, in order to make the parallelized program executable in a variety of platforms, the automatic parallelization compiler converts a directive portion of the C or Fortran for each processor into a run-time library call with the use of, for example, an automatic parallelization API standard interpretation system to be described later. The automatic parallelization API standard is an example of a predetermined standard. Thereafter, when the automatic parallelization compiler sequentially compiles a code for each processor to generate a binary, and links the generated binary, the automatic parallelization compiler can execute the parallelized program on the multi-core processor to be targeted.

2. Parallelization Procedure and Technique of Sequential Program for Built-In System The following will describe the feature of the sequential program for the built-in system and a parallelizing technique using the automatic parallelization compiler according to the present embodiment. The built-in system may be, for example, a vehicular device or an electronic device other than the vehicular device. The sequential program may be automatically generated by a model base design (as an example, sequential program automatically generated by Matlab (registered trademark) or Simulink (registered trademark) provided by MathWorks, Inc.).

The automatic parallelization compiler is configured by a conditional branch and an assignment statement, performs inline expansion and renaming on the sequential program fine in the processing, and extracts the parallelism. The automatic parallelization compiler performs a task aggregation for a conditional branch concealment for the purpose of complying with real-time, and performs static scheduling so that overhead becomes low. Furthermore, in order to perform the static scheduling in the real cost, the automatic parallelization compiler may employ the profile automatic feedback function.

In addition, in the sequential program, a conditional compilation for selecting a description to be compiled according to each type of the built-in system different in destination, function, and the configuration of hardware may be performed by a conditional compilation switch (command to the preprocessor). In such a case, information (information indicative of the destination, etc.) corresponding to any type is set as an argument of each conditional compilation switch of the sequential program to generate a binary code corresponding to the type from the sequential program.

On the contrary, the automatic parallelization compiler according to the present embodiment ignores the selection of a target to be compiled by the conditional compilation, performs the segmentation of the macro task, the extraction of parallelism, and static scheduling for all portions of the sequential program, and the like and generates the parallelized program. Thereafter, the automatic parallelization compiler identifies a description to be excluded from compilation by the conditional compilation, and generates binary data for operating the multi-core processor from the parallelized program in a state where the above description is excluded.

2-1. Operating Environment of Automatic Parallelization Compiler

Figure 1:
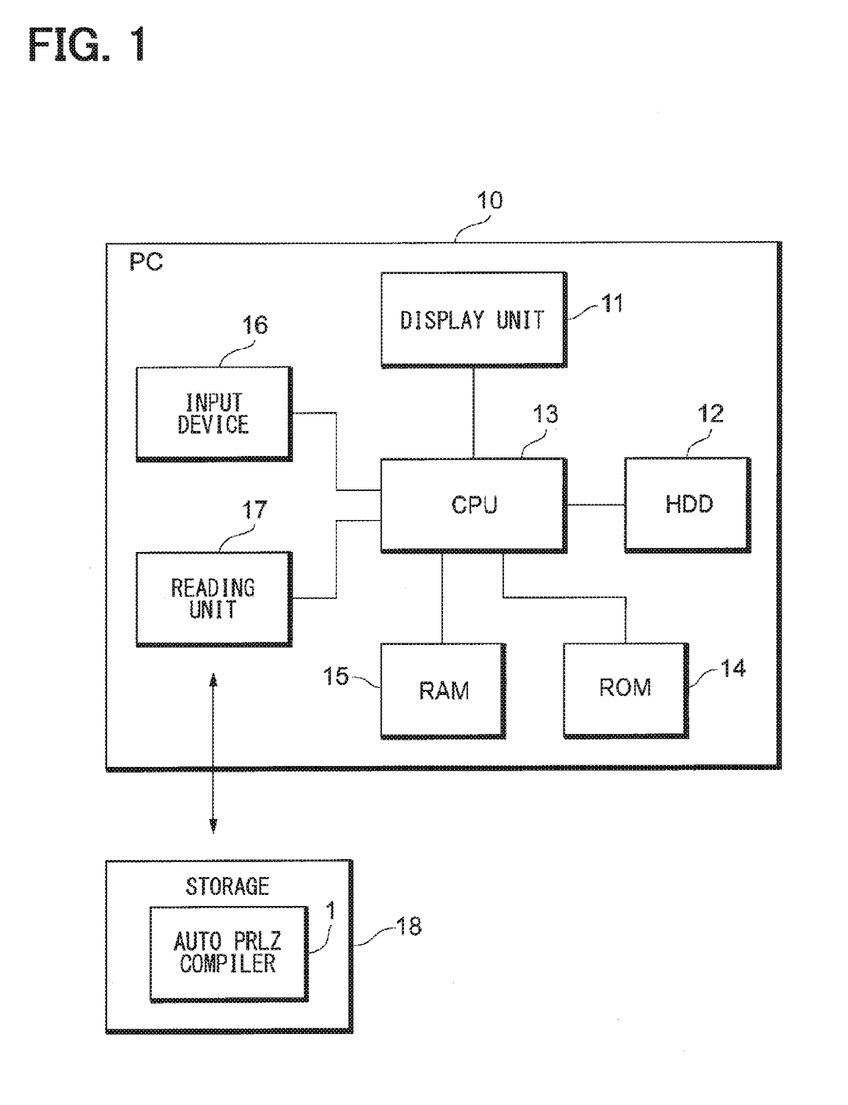
FIG. 1 is a block diagram illustrating a parallelization compiler according to an embodiment of the present disclosure.

An automatic parallelization compiler (AUTO PRLZ COMPILER) 1 is provided to a user in a state to be stored in a storage medium (STORAGE) 18 configured by an optical disc such as a digital versatile disc (DVD), a compact disk read-only memory (CD-ROM), a universal serial bus (USB) memory, or a memory card (registered trademark), a magnetic disc, or a semiconductor memory (refer to FIG. 1). It is needless to say that the automatic parallelization compiler 1 may be supplied to the user through a network.

A personal computer (PC) 10 in which the automatic parallelization compiler 1 is installed operates as an automatic parallelization compiling device. The PC 10 includes a display unit 11, a hard disk driver (HDD) 12, a central processing unit (CPU) 13, a read-only memory (ROM) 14, a random access memory (RAM) 15, an input device 16, and a reading unit 17.

The display unit 11 displays an image for the user based on an image signal transmitted from the CPU 13.

The input device 16 is configured by a keyboard a mouse and the like, and operated by the user to output a signal corresponding to the operation to the CPU 13.

The reading unit 17 is configured to read data from the storage medium 18 in which the automatic parallelization compiler 1 and so on are stored.

The RAM 15 is a readable and writable volatile memory, the ROM 14 is a read-only nonvolatile memory, and the HDD 12 is a readable and writable nonvolatile memory. Programs to be read and executed by the CPU 13 and the like are stored in the ROM 14 and the HDD 12 in advance.

The RAM 15 is used as a storage area for temporarily storing the programs or a storage area for temporarily storing data for work when the CPU 13 executes the programs stored in the ROM 14 and the HDD 12.

The CPU 13 reads an OS from the HDD 12 to execute the OS, and executes a variety of programs recorded in the HDD 12 as a process on the OS. The CPU 13 receives an input of a signal from the input device 16 as occasion demands, outputs the image signal to the display unit 11, and controls the read/write of the data with respect to the RAM 15 and the HDD 12.

The automatic parallelization compiler 1 read from the storage medium 18 through the reading unit 17 is installed in the PC 10, and the automatic parallelization compiler 1 functions as one of applications that are stored in the HDD 12, and executed as a process on the OS.

In addition, the automatic parallelization compiling device is used in the development of the parallelized program for the built-in system such as the vehicular device. However, the automatic parallelization compiling device is not limited to the above, but can be used in the development of the parallelized program for a built-in system for various applications, such as information appliances, or the development of the parallelized program in other applications aside from the built-in system.

3. Configuration of Vehicular Device

Figure 2:
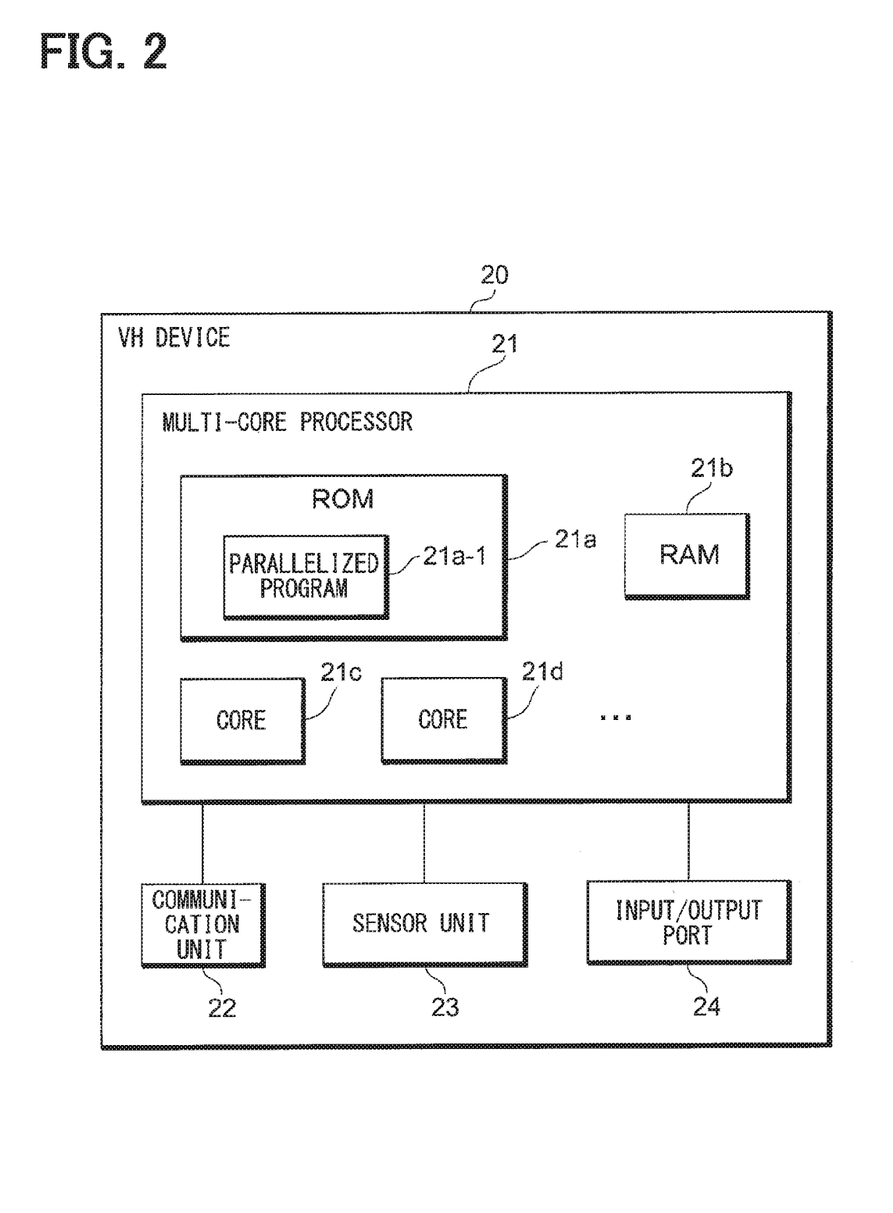
FIG. 2 is a block diagram illustrating a vehicular device according to an embodiment of the present disclosure.

The following will describe a configuration of a vehicular device (VH DEVICE) 20 that operates by the aid of the parallelized program generated by the automatic parallelization compiler 1 of the present embodiment with reference to FIG. 2. It is needless to say that the automatic parallelization compiler 1 is not limited to the vehicular device 20, but can generate the parallelized program for operating a variety of electronic devices having the same configuration.

The vehicular device 20 includes a multi-core processor 21, a communication unit 22, a sensor unit 23, an input/output port 24 and the like.

The multi-core processor 21 includes a ROM 21a, a RAM 21b, and multiple cores 21c, 21d, etc.

The ROM 21a stores a parallelized program 21a-1 (binary data) generated by the automatic parallelization compiler 1 therein. The multi-core processor 21 operates according to the parallelized program 21a-1, and comprehensively controls the vehicular device 20.

The RAM 21b is configured to be accessed by the cores 21c, 21d, etc. The communication unit 22 is configured to communicate with another ECU connected to the communication unit 22 through an in-vehicle LAN or the like.

The sensor unit 23 is configured by a variety of sensors for detecting a state of an object to be controlled and the like. The input/output port 24 is configured to transmit and receive a variety of signals for controlling the object to be controlled.

SPECIFIC EXAMPLES

The following will describe specific examples of the processing for generating the parallelized program by the automatic parallelization compiler 1 of the present embodiment. In the following description, although processes a, b, c and so on are described, each process a, b, c and so on represents a description of a series of processes including various operations, assignments, branching processing, function calls and so on.

Figure 3A:
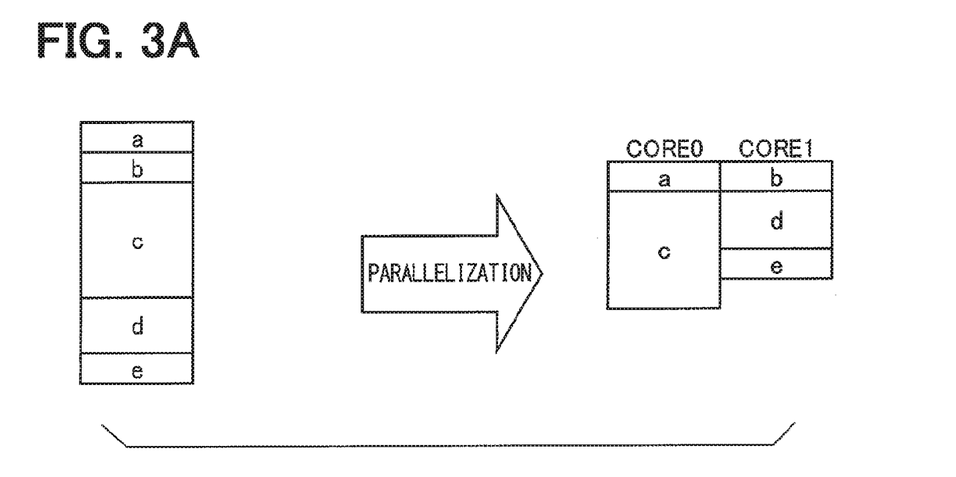
FIGS. 3A and 3B are diagrams illustrating a parallelization compiling method according to an embodiment of the present disclosure.
Figure 3B:
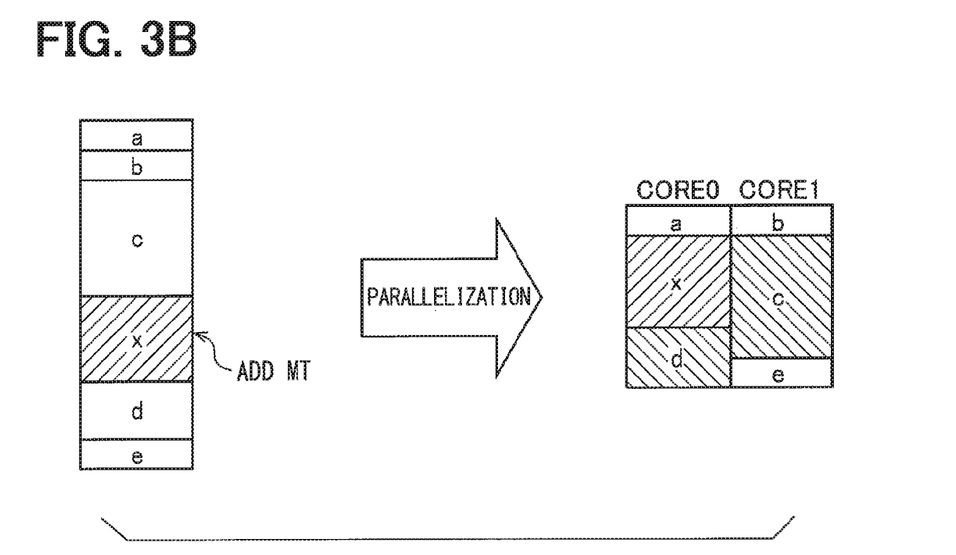

A specific example illustrated in FIGS. 3A and 3B shows a parallelizing process when no change scale minimization option is applied to the parallelization. FIG. 3A illustrates a sequential program before the macro task is added, and a segmented program obtained by parallelizing the sequential program. FIG. 3B illustrates a sequential program after a macro task x is newly added, and a segmented program obtained by parallelizing the sequential program.

In FIG. 3A, the sequential program is configured so that process a, process b, process c, process d, and process e are sequentially executed. Execution durations required by the process a, the process b, and the process e are the same with one another. The process d requires an execution duration twice as long as the execution duration of the process a. The process c requires an execution duration twice as long as the execution duration of the process d.

When assigning the process a to the process e to core 0 and core 1 and parallelizing the processes so that the overall execution duration becomes shortest, the process a and the process c are assigned to the core 0, and the process b, the process d, and the process e are assigned to the core 1.

As shown in FIG. 3B, a process x that is a macro task is added to the sequential program shown in FIG. 3A. When assigning the process a to the process e, and the process x to core 0 and core 1 and parallelizing the processes so that the overall execution duration becomes shortest, the process a, the process x, and the process d are assigned to the core 0, and the process b, the process c, and the process e are assigned to the core 1.

When FIG. 3A is compared with FIG. 3B, it is sure that the parallelization is optimal from the viewpoint of shortening the overall execution duration maximally. However, the process c assigned to the core 0 in FIG. 3A is assigned to the core 1 in FIG. 3B, and the process d assigned to the core 1 in FIG. 3A is assigned to the core 0 in FIG. 3B. As described above, each of the process c and the process d is assigned to the different cores before and after the addition of the process x. That is, the process c and the process d move or migrate between the core 0 and core 1 when the program change is made to the sequential program.

Figure 4A:
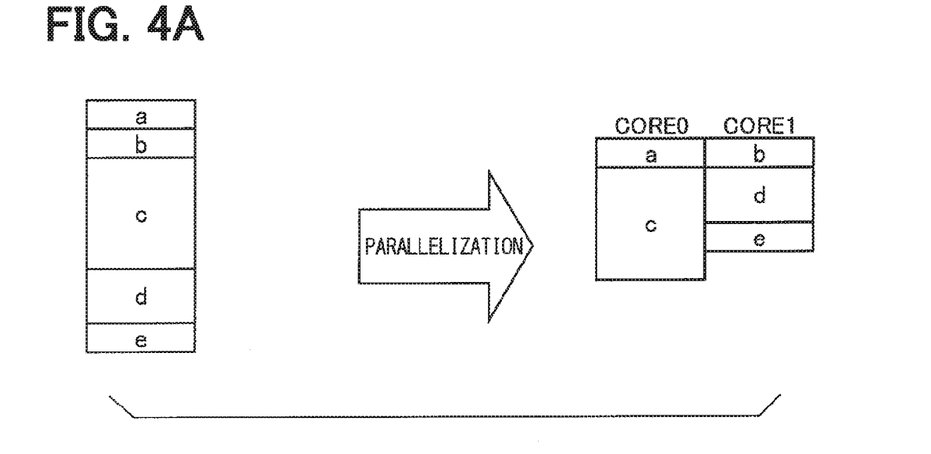
FIGS. 4A and 4B are diagrams illustrating the parallelization compiling method according to an embodiment of the present disclosure.
Figure 4B:
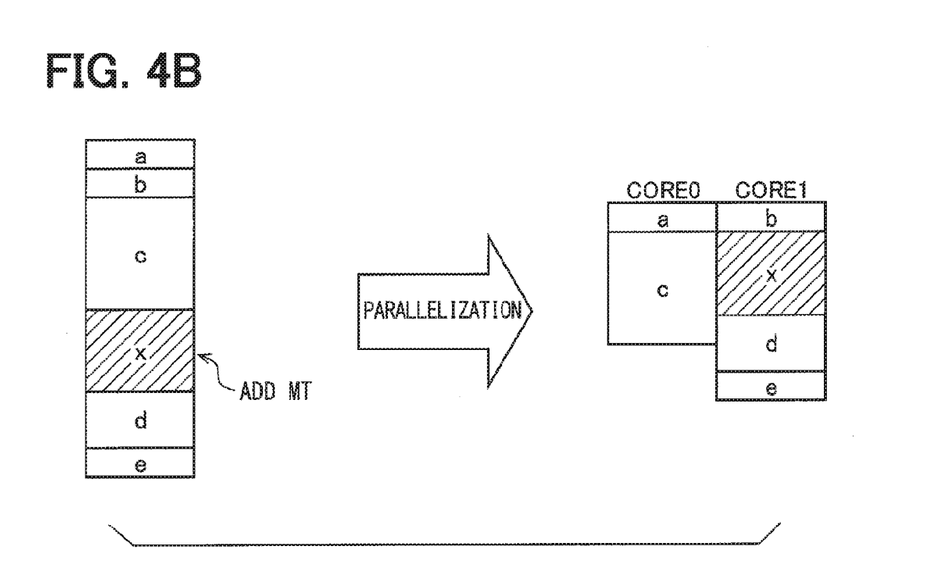

The following will describe the change scale minimization option that forbids the pre-assigned process from moving or migrating between the cores. A specific example illustrated in FIGS. 4A and 4B shows a parallelizing process when the change scale minimization option is applied to the compiling of the sequential program to the parallelized program. FIG. 4A illustrates a sequential program before the macro task is added, and a segmented program obtained by parallelizing the sequential program (first unit). FIG. 4B illustrates a sequential program after the macro task x is newly added (second unit), and a segmented program obtained by parallelizing the sequential program to which the macro task is added (third unit).

In FIG. 4A, the sequential program is configured so that process a, process b, process c, process d, and process e are sequentially executed. Execution durations required by the process a, the process b, and the process e are the same with one another. The process d requires an execution duration twice as long as the execution duration of the process a. The process c requires an execution duration twice as long as the execution duration of the process d.

When assigning the process a to the process e to core 0 and core 1 and parallelizing the processes so that the overall execution duration becomes shortest, the process a and the process c are assigned to the core 0, and the process b, the process d, and the process e are assigned to the core 1.

As shown in FIG. 4B, the process x that is a macro task is added to the sequential program shown in FIG. 4A. When the change scale minimization option is applied, the processes that are assigned to respective cores in a prior assignment shown in FIG. 4A are not changed. Specifically, the process x is assigned to the core 1 having shorter execution duration without changing the assignment of the processes to the cores. Specifically, assignment of the process a and the process c to the core 0, and the assignment of the process b, the process d, and the process e to the core 1 are not changed caused by the addition of the process x to the sequential program.

When FIG. 3B is compared with FIG. 4B, the parallelization illustrated in FIG. 3B is more excellent from the viewpoint of shortening the overall execution duration maximally. However, the parallelization illustrated in FIG. 4B is more excellent from the viewpoint of maximally reducing the movement or migration of the process that has already been assigned.

Figure 5A:
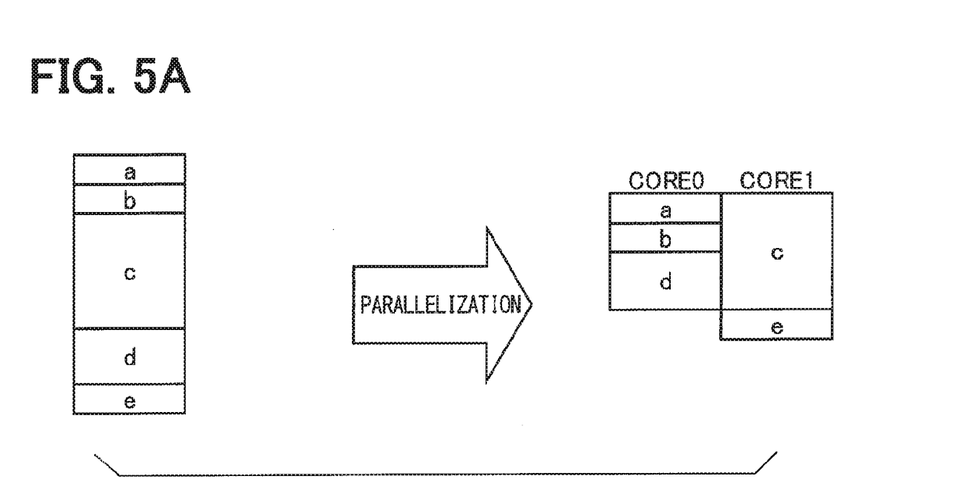
FIGS. 5A and 5B are diagrams illustrating the parallelization compiling method according to an embodiment of the present disclosure.
Figure 5B:
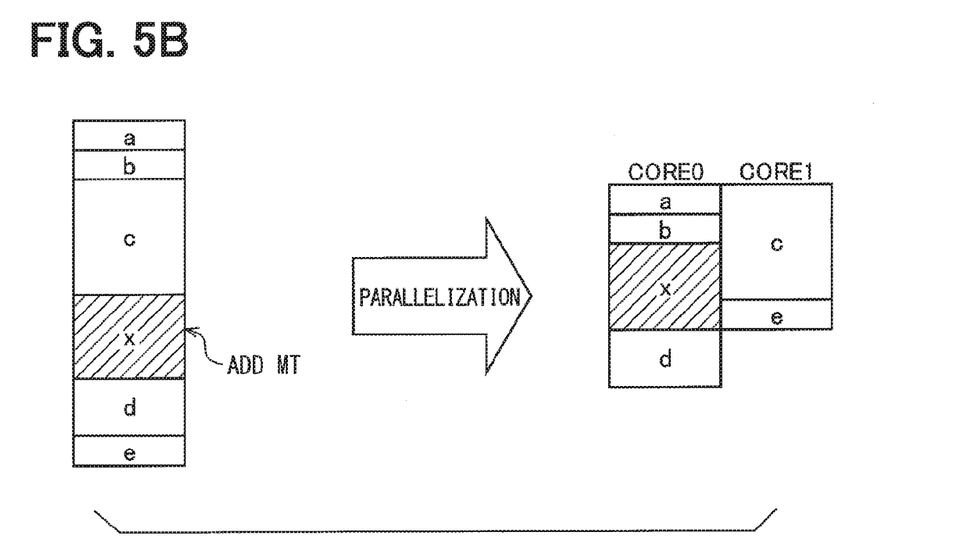

The following will describe a modification of the parallelizing process with the change scale minimization option illustrated in FIGS. 4A and 4B. The modification will be described with reference to FIGS. 5A and 5B. A specific example illustrated in FIGS. 5A and 5B shows a parallelizing process when the change scale minimization option is applied to the parallelization. FIG. 5A illustrates a sequential program before the macro task is added, and a segmented program obtained by parallelizing the sequential program (first unit). FIG. 5B illustrates a sequential program after the macro task x is newly added (second unit), and a segmented program obtained by parallelizing the sequential program to which the macro task is added (third unit).

In FIG. 5A, the sequential program is configured so that process a, process b, process c, process d, and process e are sequentially executed. Execution durations required by the process a, the process b, and the process e are the same with one another. The process d requires an execution duration twice as long as the execution duration of the process a. The process c requires an execution duration twice as long as the execution duration of the process d.

When assigning the process a to the process e to core 0 and core 1 and parallelizing the processes so that the overall execution duration becomes shortest, the process a, the process b, and the process d are assigned to the core 0, and the process c and the process e are assigned to the core 1. The assignment of processes a to e is different from the process assignment shown in FIG. 4A.

As shown in FIG. 5B, the process x that is a macro task is added to the sequential program in FIG. 5A. When the change scale minimization option is applied to the parallelization, the processes that have already been assigned to respective cores shown in FIG. 5A are not changed as much as possible. Specifically, the process x is assigned to the core 0 having shorter execution duration without changing the assignment of the process a, the process b, and the process d to the core 0, and the assignment of the process c and the process e to the core 1.

Figure 6A:
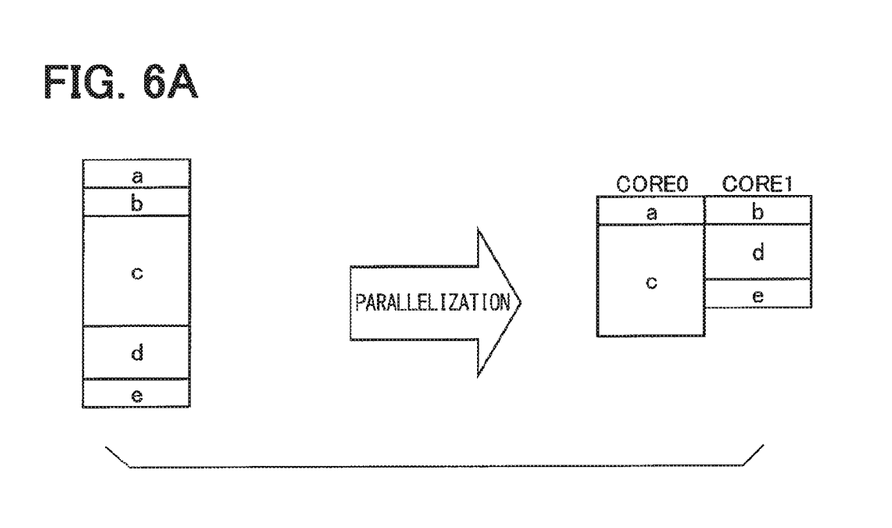
FIGS. 6A and 6B are diagrams illustrating the parallelization compiling method according to an embodiment of the present disclosure.
Figure 6B:
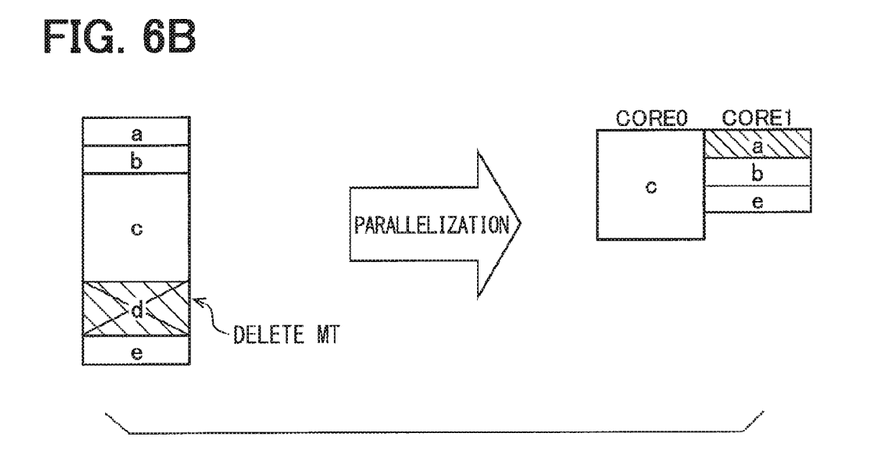

The following will describe the parallelization when the macro task is deleted from the sequential program. A specific example illustrated in FIGS. 6A and 6B shows a parallelizing process when no change scale minimization option is applied to the parallelization. FIG. 6A illustrates a sequential program before the macro task is deleted, and a segmented program obtained by parallelizing the sequential program (first unit). FIG. 6B illustrates a sequential program after the macro task is deleted (second unit), and a segmented program obtained by parallelizing the sequential program (third unit).

In FIG. 6A, the sequential program is configured so that process a, process b, process c, process d, and process e are sequentially executed. Execution durations required by the process a, the process b, and the process e are the same with one another. The process d requires an execution duration twice as long as the execution duration of the process a. The process c requires an execution duration twice as long as the execution duration of the process d.

When assigning the process a to the process e to core 0 and core 1 and parallelizing the processes so that the overall execution duration becomes shortest, the process a and the process c are assigned to the core 0, and the process b, the process d, and the process e are assigned to the core 1.

As shown in FIG. 6B, the process d which is a macro task is deleted from the sequential program in FIG. 6A. When assigning the processes a to c and e to core 0 and core 1 and parallelizing the processes so that the overall execution duration becomes shortest, the process c is assigned to the core 0, and the process a, the process b, and the process e are assigned to the core 1.

When FIG. 6A is compared with FIG. 6B, it is sure that the parallelization is optimal from the viewpoint of shortening the overall execution duration maximally. However, the process a assigned to the core 0 in FIG. 6A is assigned to the core 1 in FIG. 6B. As described above, the process a is assigned to the different cores before and after the deletion of the process d. That is, the process a moves or migrates between the core 0 and core 1 when the program change is made to the sequential program.

Figure 7A:
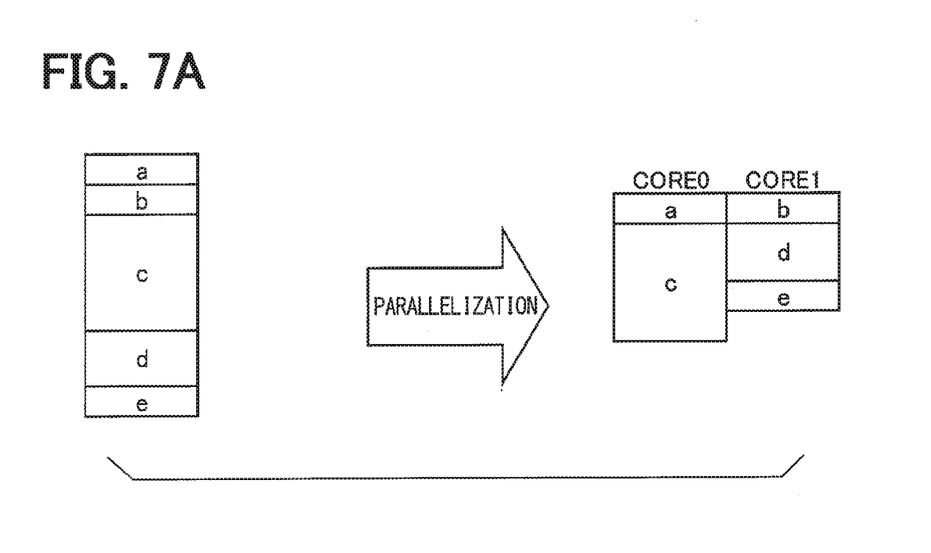
FIGS. 7A and 7B are diagrams illustrating the parallelization compiling method according to an embodiment of the present disclosure.
Figure 7B:
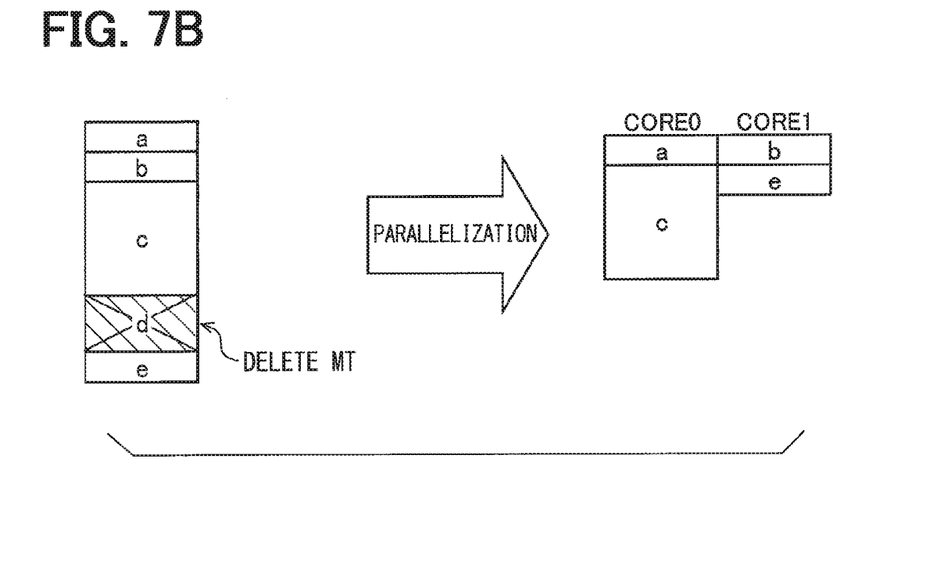

The following will describe the change scale minimization option that forbids pre-assigned process from moving or migrating between the cores. A specific example illustrated in FIGS. 7A and 7B shows a parallelizing process when the change scale minimization option is applied to the parallelization. FIG. 7A illustrates a sequential program before the macro task d is deleted, and a segmented program obtained by parallelizing the sequential program (first unit). FIG. 7B illustrates a sequential program after the macro task d is deleted (second unit), and a segmented program obtained by parallelizing the sequential program from which the macro task is deleted (third unit).

In FIG. 7A, the sequential program is configured so that process a, process b, process c, process d, and process e are sequentially executed. Execution durations required by the process a, the process b, and the process e are the same with one another. The process d requires an execution duration twice as long as the execution duration of the process a. The process c requires an execution duration twice as long as the execution duration of the process d.

When assigning the process a to the process e to core 0 and core 1 and parallelizing the processes so that the overall execution duration becomes shortest, the process a and the process c are assigned to the core 0, and the process b, the process d, and the process e are assigned to the core 1.

In FIG. 7B, the process d, which is a macro task, is deleted from the sequential program shown in FIG. 7A. When the change scale minimization option is applied to the parallelization, the processes that have already been assigned to respective cores shown in FIG. 7A are not changed. Specifically, only the process d that has been assigned to the core 1 is deleted without changing the assignment of the process a and the process c to the core 0 and the assignment of the process b and the process e to the core 1.

When FIG. 6B is compared with FIG. 7B, the parallelization illustrated in FIG. 6B is more excellent from the viewpoint of shortening the overall execution duration maximally. However, the parallelization illustrated in FIG. 7B is more excellent from the viewpoint of maximally reducing the movement or migration of the process that has already been assigned.

Figure 8A:
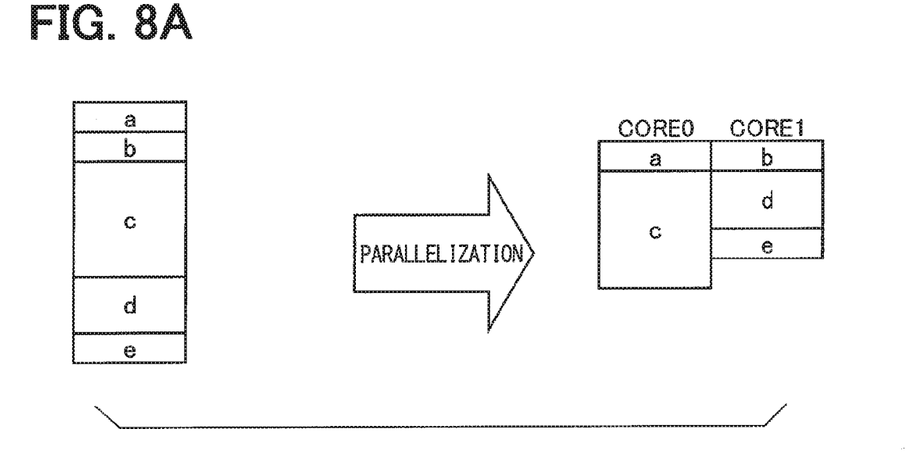
FIGS. 8A and 8B are diagrams illustrating the parallelization compiling method according to an embodiment of the present disclosure.
Figure 8B:
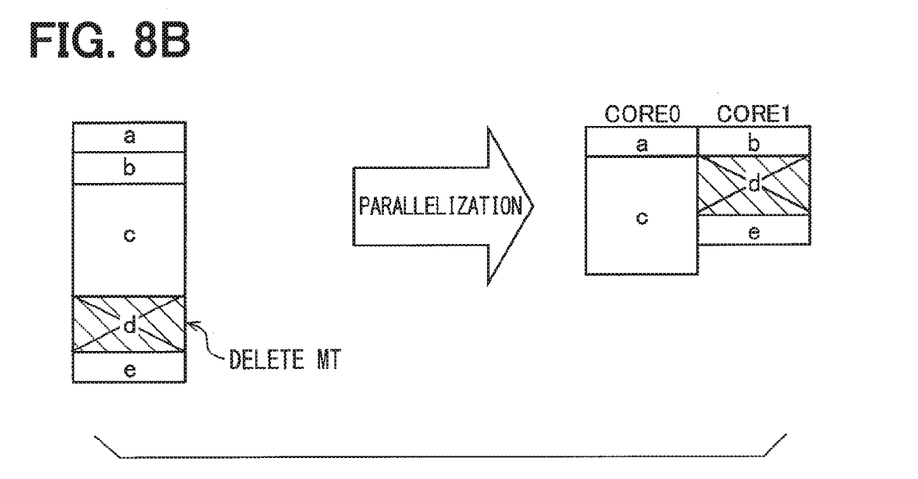

The following will describe a parallelization example when a data dependency exists between the process a and the process d and a data dependency exists between the process d and the process e with reference to FIGS. 8A and 8B. Suppose that, in this example, the data dependencies are defined in the sequential program based on the case shown in FIGS. 7A and 7B.

The example illustrated in FIGS. 8A and 8B shows a parallelizing process when the change scale minimization option is applied to the parallelization and data dependencies are defined between macro tasks included in the sequential program. FIG. 8A illustrates a sequential program before the macro task is deleted, and a segmented program obtained by parallelizing the sequential program (first unit). FIG. 8B illustrates a sequential program after the macro task has been deleted (second unit), and a segmented program obtained by parallelizing the sequential program from which the macro task is deleted (third unit).

In FIG. 8A, the sequential program is configured so that process a, process b, process c, process d, and process e are sequentially executed. Execution durations required by the process a, the process b, and the process e are the same with one another. The process d requires an execution duration twice as long as the execution duration of the process a. The process c requires an execution duration twice as long as the execution duration of the process d.

When assigning the process a to the process e to core 0 and core 1 and parallelizing the processes so that the overall execution duration becomes shortest, the process a and the process c are assigned to the core 0, and the process b, the process d, and the process e are assigned to the core 1.

In FIG. 8B, the process d, which is a macro task, is deleted from the sequential program in FIG. 8A. When the change scale minimization option is applied to the parallelization, the processes that have already been assigned to respective cores shown in FIG. 8A are not changed. Specifically, the assignment of the process a and the process c to the core 0, and the assignment of the process b and the process e to the core 1 are not changed.

In the example illustrated in FIGS. 8A and 8B, as described above, suppose that a data dependency exists between the process a and the process d and a data dependency exists between the process d and the process e. When the process d is simply deleted, the data dependency between the process a and the process e through the d is eliminated, and a trouble may occur in the execution of the process e. Considering this, in the preset example, only the processing commands of the process d are deleted from the sequential program, and information indicating existence of the dependency between the process d and the process a and existence of the dependency between the process d and the process e is remained. For that reason, in the core 1, a processing load caused by the commands of the process d is reduced, and a reliable execution of the process e is ensured.

The above-described parallelization compiling method may be executed by the automatic parallelization compiling device 10, or may also be executed by the multi-core processor 21 of the vehicular device 20 instead of the automatic parallelization compiling device 10.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A parallelization compiling method for generating a segmented program, which is executable by a multi-core processor, from a sequential program, which is executable by a single-core processor, by parallelizing the sequential program, the parallelization compiling method comprising:
assigning one or more macro tasks included in the sequential program to a plurality of cores included in the multi-core processor in order to generate the segmented program;
adding a new macro task to the sequential program or deleting one of the one or more macro tasks from the sequential program; and
assigning again the sequential program, to which addition or deletion of the macro task is carried out, to the plurality of cores under a condition that the one or more macro tasks previously assigned to the plurality of cores do not migrate among the plurality of cores,
wherein among the plurality of cores, a target core to which the new macro task is assigned is determined so that an execution duration of the segmented program after adding the new macro task has a minimum value compared with a case in which the new macro task is assigned to another core under a condition that the new macro task has no dependency relation with the one or more macro tasks included in the sequential program.

2. The parallelization compiling method according to claim 1, wherein,
when the new macro task is added to the sequential program, in compiling of the sequential program into the segmented program, an assignment of the one or more macro tasks to the plurality of cores is maintained without change and a target core to which the new macro task is assigned among the plurality of cores is determined based on an execution duration of the segmented program to which the new macro task is added.

3. The parallelization compiling method according to claim 1, wherein,
when the one of the one or more macro tasks is to be deleted from the sequential program, in compiling of the sequential program into the segmented program, a deletion of the one of the one or more macro tasks is carried out and an assignment of the remains of the one or more macro tasks to the plurality of cores is maintained without change.

4. The parallelization compiling method according to claim 3, wherein,
when deleting the one of the one or more macro tasks from the sequential program, information indicating a data dependency related to the one of the one or more macro tasks is remained without deletion.

5. A parallelization compiler stored in a non-transitory tangible computer readable storage medium as a program product, wherein the parallelization compiler generates a segmented program, which is executable by a multi-core processor, from a sequential program, which is executable by a single-core processor, by parallelizing the sequential program, the parallelization compiler comprising instructions to be executed by a parallelization compiling device, the instructions for implementing:

assigning one or more macro tasks included in the sequential program to a plurality of cores included in the multi-core processor in order to generate the segmented program;

adding a new macro task to the sequential program or deleting one of the one or more macro tasks from the sequential program; and assigning again the sequential program, to which addition or deletion of the macro task is carried out, to the plurality of cores under a condition that the one or more macro tasks previously assigned to the plurality of cores do not migrate among the plurality of cores, wherein among the plurality of cores, a target core to which the new macro task is assigned is determined so that an execution duration of the segmented program after adding the new macro task has a minimum value compared with a case in which the new macro task is assigned to another core under a condition that the new macro task has no dependency relation with the one or more macro tasks included in the sequential program.

6. The parallelization compiler according to claim 5, wherein, when the new macro task is added to the sequential program, in compiling of the sequential program into the segmented program, an assignment of the one or more macro tasks to the plurality of cores is maintained without change and a target core to which the new macro task is assigned among the plurality of cores is determined based on an execution duration of the segmented program to which the new macro task is added.

7. The parallelization compiler according to claim 6, wherein, among the plurality of cores, the target core to which the new macro task is assigned is determined so that the execution duration of the segmented program after adding the new macro task has a minimum value compared with a case in which the new macro task is assigned to another core.

8. The parallelization compiler according to claim 5, wherein, when the one of the one or more macro tasks is to be deleted from the sequential program, in compiling of the sequential program into the segmented program, a deletion of the one of the one or more macro tasks is carried out and an assignment of the remains of the one or more macro tasks to the plurality of cores is maintained without change.

9. The parallelization compiler according to claim 8, wherein, when deleting the one of the one or more macro tasks from the sequential program, information indicating a data dependency related to the one of the one or more macro tasks is remained without deletion.

10. A vehicular device comprising:

a multi-core processor, wherein the multi-core processor operates based on a segmented program, which is executable by the multi-core processor and is generated by parallelization from a sequential program executable by a single-core processor, and the multi-core processor is configured to:

assign one or more macro tasks included in the sequential program to a plurality of cores included in the multi-core processor in order to generate the segmented program;

add a new macro task to the sequential program or deleting one of the one or more macro tasks from the sequential program; and assign again the sequential program, to which addition or deletion of the macro task is carried out, to the plurality of cores under a condition that the one or more macro tasks previously assigned to the plurality of cores do not migrate among the plurality of cores, wherein among the plurality of cores, a target core to which the new macro task is assigned is determined so that an execution duration of the segmented program after adding the new macro task has a minimum value compared with a case in which the new macro task is assigned to another core under a condition that the new macro task has no dependency relation with the one or more macro tasks included in the sequential program.

11. The vehicular device according to claim 10, wherein, when the new macro task is added to the sequential program, in compiling of the sequential program into the segmented program, an assignment of the one or more macro tasks to the plurality of cores is maintained without change and a target core to which the new macro task is assigned among the plurality of cores is determined based on an execution duration of the segmented program to which the new macro task is added.

12. The vehicular device according to claim 11, wherein, among the plurality of cores, the target core to which the new macro task is assigned is determined so that the execution duration of the segmented program after adding the new macro task has a minimum value compared with a case in which the new macro task is assigned to another core.

13. The vehicular device according to claim 10, wherein, when the one of the one or more macro tasks is to be deleted from the sequential program, in compiling of the sequential program into the segmented program, a deletion of the one of the one or more macro tasks is carried out and an assignment of the remains of the one or more macro tasks to the plurality of cores is maintained without change.

14. The vehicular device according to claim 13, wherein, when deleting the one of the one or more macro tasks from the sequential program, information indicating a data dependency related to the one of the one or more macro tasks is remained without deletion.

* * * * *